United States Patent
Guo et al.

(10) Patent No.: US 10,235,923 B2
(45) Date of Patent: Mar. 19, 2019

(54) PIXEL ARRAY AND DRIVING METHOD THEREOF AND DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN); Shengji Yang, Beijing (CN); Lingyun Shi, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 140 days.

(21) Appl. No.: 15/022,610

(22) PCT Filed: Oct. 1, 2014

(86) PCT No.: PCT/CN2014/088084
§ 371 (c)(1),
(2) Date: Mar. 17, 2016

(87) PCT Pub. No.: WO2016/000343
PCT Pub. Date: Jan. 7, 2016

(65) Prior Publication Data
US 2016/0217726 A1 Jul. 28, 2016

(30) Foreign Application Priority Data
Jul. 4, 2014 (CN) .......................... 2014 1 0317831

(51) Int. Cl.
*G09G 3/20* (2006.01)
*G09G 3/36* (2006.01)
*G09G 3/3291* (2016.01)

(52) U.S. Cl.
CPC ......... *G09G 3/2074* (2013.01); *G09G 3/2003* (2013.01); *G09G 3/3291* (2013.01);
(Continued)

(58) Field of Classification Search
CPC .. G09G 3/2074; G09G 3/2003; G09G 3/3291; G09G 3/3688; G09G 2320/0646; G09G 2320/0666; G09G 2320/0443
See application file for complete search history.

(56) References Cited

U.S. PATENT DOCUMENTS

| 5,311,337 A | 5/1994 | McCartney, Jr. |
| 6,914,649 B2 | 7/2005 | Liu |

(Continued)

FOREIGN PATENT DOCUMENTS

| CN | 1637560 A | 7/2005 |
| CN | 101009083 A | 8/2007 |

(Continued)

OTHER PUBLICATIONS

Third Chinese Office Action dated Sep. 14, 2016.
(Continued)

*Primary Examiner* — Alexander Eisen
*Assistant Examiner* — Kebede T Teshome
(74) *Attorney, Agent, or Firm* — Dilworth & Barrese, LLP; Michael J. Musella, Esq.

(57) ABSTRACT

A pixel array, comprising multiple pixel units; each pixel unit comprises three sub-pixels in different colors, the three sub-pixels being a red sub-pixel (R), a green sub-pixel (G) and a blue sub-pixel (B) respectively; the connecting lines between central points of the three sub-pixels form a tri- (Continued)

angle, and each sub-pixel is a cruciform consisting of a rectangle with an aspect ratio of 3:1 in the transverse direction and the longitudinal direction respectively, and having equal lengths in the transverse direction and the longitudinal direction. Also provided are a method of driving the pixel array and a display panel comprising the pixel array. Driving the pixel array with the driving method enables the display panel to have higher visual resolution.

13 Claims, 6 Drawing Sheets

(52) U.S. Cl.
CPC ....... *G09G 3/3688* (2013.01); *G02F 2201/52* (2013.01); *G09G 3/3614* (2013.01); *G09G 2300/0426* (2013.01); *G09G 2300/0443* (2013.01); *G09G 2300/0452* (2013.01); *G09G 2320/0646* (2013.01); *G09G 2320/0666* (2013.01); *G09G 2340/0457* (2013.01)

(56) References Cited

U.S. PATENT DOCUMENTS

| | | | |
|---|---|---|---|
| 7,248,271 B2 | 7/2007 | Credelle et al. | |
| 7,505,053 B2 | 3/2009 | Brown Elliott | |
| 2002/0036625 A1* | 3/2002 | Nakamura | G09G 3/3618 345/204 |
| 2005/0068321 A1 | 3/2005 | Jiao | |
| 2005/0225563 A1 | 10/2005 | Brown Elliott | |
| 2007/0070093 A1 | 3/2007 | Lin | |
| 2009/0115712 A1 | 5/2009 | Morimoto | |
| 2009/0244101 A1 | 10/2009 | Langendijk | |
| 2010/0001988 A1 | 1/2010 | Kim | |
| 2010/0182523 A1* | 7/2010 | Woo | G02F 1/134363 349/37 |
| 2010/0283803 A1 | 11/2010 | Chou | |
| 2012/0280896 A1* | 11/2012 | Yamashita | G09G 3/3607 345/88 |
| 2013/0010235 A1 | 1/2013 | Hirosawa et al. | |
| 2013/0343010 A1 | 12/2013 | Hwang | |
| 2014/0098418 A1 | 4/2014 | Lin | |
| 2015/0228214 A1 | 8/2015 | Liao et al. | |
| 2016/0027359 A1 | 1/2016 | Guo et al. | |
| 2016/0049110 A1 | 2/2016 | Shi et al. | |

FOREIGN PATENT DOCUMENTS

| | | |
|---|---|---|
| CN | 101076844 A | 11/2007 |
| CN | 101176108 A | 5/2008 |
| CN | 101211518 A | 7/2008 |
| CN | 101303842 A | 11/2008 |
| CN | 101393366 A | 3/2009 |
| CN | 101719037 A | 6/2010 |
| CN | 101937155 A | 1/2011 |
| CN | 102073175 A | 5/2011 |
| CN | 102075175 A | 5/2011 |
| CN | 20235072 U | 6/2012 |
| CN | 102903316 A | 1/2013 |
| CN | 103163683 A | 6/2013 |
| CN | 103278960 A | 9/2013 |
| CN | 103529572 A | 1/2014 |
| CN | 103777393 A | 5/2014 |
| CN | 103778882 A | 5/2014 |
| CN | 103824520 A | 5/2014 |
| CN | 103824520 A | 6/2014 |
| CN | 103886808 A | 6/2014 |
| CN | 103886809 A | 6/2014 |
| CN | 103887307 A | 6/2014 |
| CN | 103903524 A | 7/2014 |
| CN | 104036701 A | 9/2014 |
| CN | 20391380 U | 11/2014 |
| CN | 204029329 U | 12/2014 |
| EP | 3163557 A1 | 9/2014 |
| GB | 2320790 A | 1/1998 |
| JP | 2012133011 A * | 7/2012 |
| KR | 10200400446452 A | 11/2002 |
| KR | 101005903 B1 | 1/2011 |
| WO | 2008131027 A1 | 10/2008 |
| WO | 2010140757 A2 | 12/2010 |
| WO | 2014014032 A1 | 1/2014 |

OTHER PUBLICATIONS

United States Office Action dated Mar. 17, 2017 in related U.S. Appl. No. 14/769,923.
Search Report and Written Opinion dated Apr. 15, 2015 from State Intellectual Property Office of the P.R. China.
First Chinese Office Action dated Jan. 21, 2016.
Second Chinese Office Action dated Jun. 28, 2016.
International Search Report of International Application PCT/CN2014/087586 (corresponding to U.S. Appl. No. 14/769,923).
Office Action issued in U.S. Appl. No. 14/769,923 dated Dec. 13, 2016.
International Search Report of International Application No. PCT/CN2014/085477 (corresponding to U.S. Appl. No. 14/436,926).
Eurpoean Search Report dated Feb. 7, 2018.
Partial Supplementary European Search Report dated Dec. 14, 2017 (Issued in foreign counterpart of related U.S. Appl. No. 14/769,923).
Extended European Search Report dated Apr. 23, 2018.
European Search Report dated Jul. 3, 2018.

* cited by examiner

PIXEL ARRAY AND DRIVING METHOD THEREOF AND DISPLAY PANEL

TECHNICAL FIELD

At least one embodiment of the present disclosure relates to a pixel array and a driving method thereof and a display panel.

BACKGROUND

In a current display panel, the common pixel design is that three sub-pixels (including a red (R) sub-pixel, a green (G) sub-pixel and a blue (B) sub-pixel) or four sub-pixels (an R sub-pixel, a G sub-pixel, a B sub-pixel and a white (W) sub-pixel) are combined to form a pixel unit for display.

SUMMARY

At least one embodiment of the present disclosure provides a pixel array, a driving method thereof and a display panel. When the driving method is used for driving the pixel array for display, the display panel can obtain high visual resolution.

In one aspect, at least one embodiment of the present disclosure provides a pixel array. The pixel array comprises a plurality of pixel units. Each pixel unit includes three sub-pixels of different colors. The three sub-pixels are respectively an R sub-pixel, a G sub-pixel and a B sub-pixel. In each pixel unit, a triangle is formed by connecting lines of center points of the three sub-pixels; each sub-pixel is in a shape of crisscross; the crisscross is formed by rectangles with a length-width ratio of 3:1 in the horizontal direction and the vertical direction respectively; and a length of the crisscross in the horizontal direction is equal to a length of the crisscross in the vertical direction.

In another aspect, at least one embodiment of the present disclosure provides a display panel. The display panel comprises a pixel array, a plurality of data lines and a plurality of gate lines. The pixel array is the pixel array provided by the embodiment of the present disclosure.

In still another aspect, at least one embodiment of the present disclosure provides a method for driving a pixel array. The pixel array includes a plurality of real sub-pixel units. Each real sub-pixel unit includes three real sub-pixels of different colors. The three real sub-pixels are respectively a real R sub-pixel, a real G sub-pixel and a real B sub-pixel. In each pixel unit, a triangle is formed by connecting lines of center points of the three real sub-pixels; each real sub-pixel is in a shape of crisscross; the crisscross is formed by rectangles with a length-width ratio of 3:1 in the horizontal direction and the vertical direction respectively; and a length of the crisscross in the horizontal direction is equal to a length of the crisscross in the vertical direction. The driving method comprises: S1: dividing an image to be displayed into a plurality of theoretical pixel units, in which each theoretical pixel unit includes three theoretical sub-pixels of different colors, and the three theoretical sub-pixels are respectively a theoretical R sub-pixel, a theoretical G sub-pixel and a theoretical B sub-pixel, and calculating the theoretical brightness value of each theoretical sub-pixel; S2: calculating actual brightness values of the real sub-pixels, in which the brightness value of a real sub-pixel to be calculated is a sum of at least a part of the theoretical brightness value of a theoretical sub-pixel corresponding to the real sub-pixel to be calculated and a part of the theoretical brightness value of a theoretical sub-pixel corresponding to at least one sharing real sub-pixel, the sharing real sub-pixel has the same color as the real sub-pixel to be calculated; and a connecting line of the sharing real sub-pixel and the real sub-pixel to be calculated does not run through other real sub-pixels having the same color as the real sub-pixel to be calculated; and S3: inputting signals into the real sub-pixels, so that the real sub-pixels have the actual brightness value calculated in the step S2.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

It should be understood that in connection with the accompanying drawings, "R" represents red, "G" representing green, and "B" representing blue.

The inventors of the application have noted that the physical resolution and the visual resolution of a display panel are equal to each other when pixel units adopt the common pixel design of three sub-pixels or four sub-pixels. When the viewing experience requirement of users on display screens is increased, higher visual resolution is required, and hence the pixel per inch (PPI) of display panels would be increased. Due to the increased PPI of display panels, the process for manufacturing a display panel becomes more difficult. Therefore, those skilled in the art wish to increase the visual resolution of display panels without increasing the difficulty of the manufacturing process.

Figure 1:
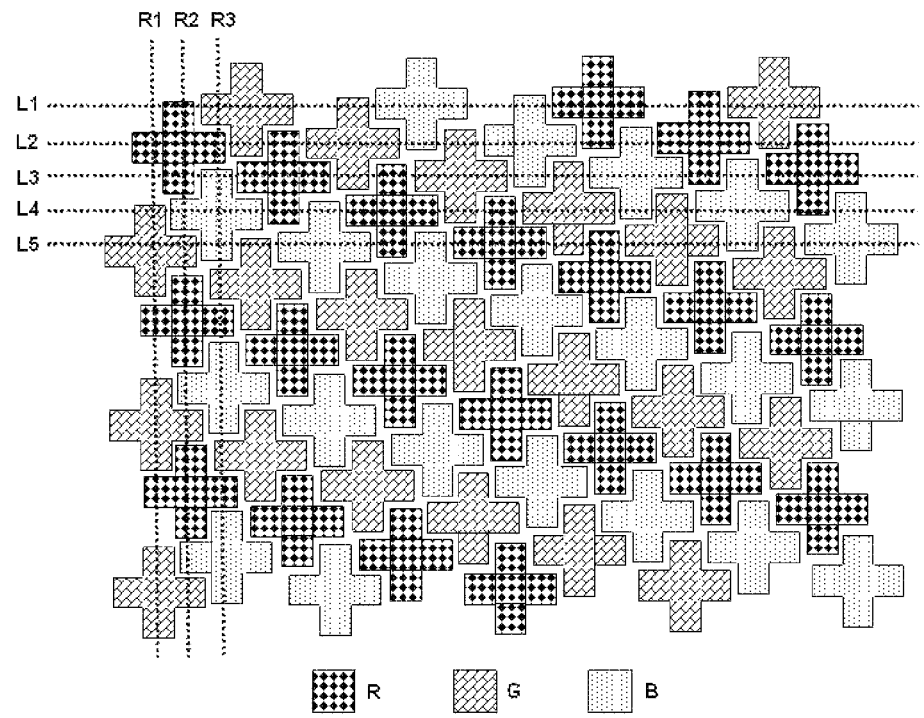
FIG. 1 is a schematic diagram of a first embodiment of a pixel array provided by an embodiment of the present disclosure.
Figure 2:
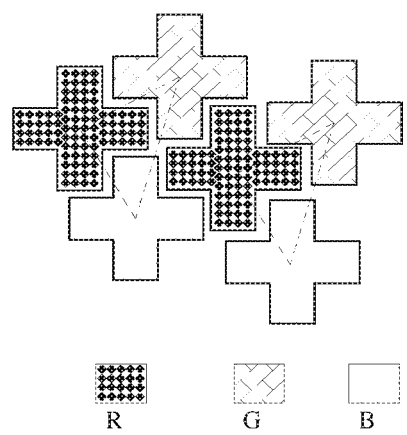
FIG. 2 is a schematic diagram of two pixel units in the pixel array as illustrated in FIG. 1.
Figure 3:
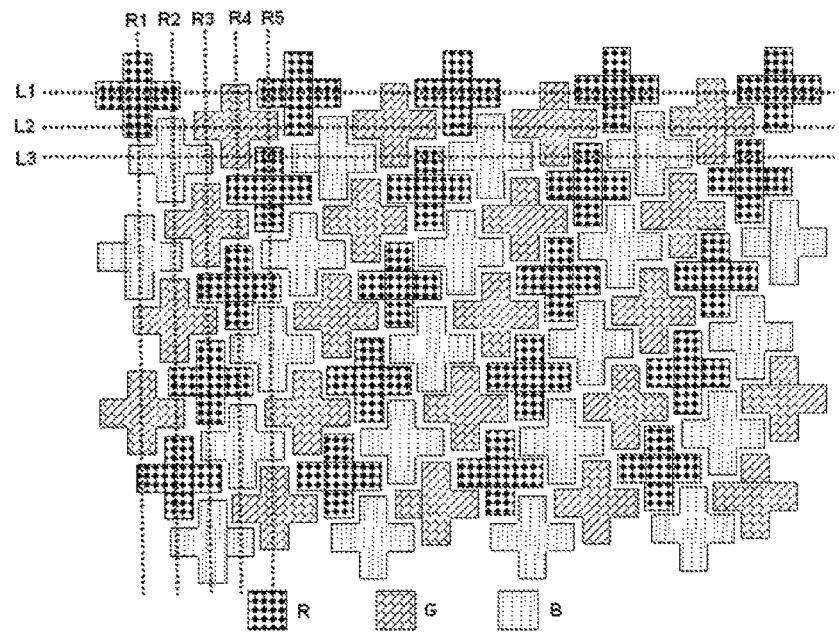
FIG. 3 is a schematic diagram of a second embodiment of the pixel array provided by an embodiment of the present disclosure.

In one aspect, as illustrated in FIGS. 1 to 3, at least one embodiment of the present disclosure provides a pixel array. The pixel array comprises a plurality of pixel units. Each pixel unit includes three sub-pixels of different colors. The three sub-pixels are respectively an R sub-pixel, a G sub-pixel, and a B sub-pixel. In each pixel unit, a triangle is obtained by lines of connecting center points of the three sub-pixels (as illustrated in FIG. 2); each sub-pixel is in a shape of crisscross; the crisscross is formed by rectangles with the length-width ratio of 3:1 in the horizontal direction and the vertical direction respectively; and the length of the crisscross in the horizontal direction is equal to the length of the crisscross in the vertical direction.

As each sub-pixel is in a shape of crisscross, the sub-pixels in the pixel array can be tightly arranged, so that the display panel comprising the pixel array can have high physical resolution. When the pixel array is driven by the driving method provided by an embodiment of the present disclosure, the brightness output area of the pixel array can be larger, and hence the visual resolution of the display panel comprising the pixel array can be higher than the physical resolution of the display panel comprising the pixel array.

Because a triangle is formed by the connecting lines of the center points of the three sub-pixels in each pixel unit (as illustrated in FIGS. 1 and 2), the sub-pixels of different colors in the pixel array can be more uniformly distributed.

It should be understood that in the pixel array provided by the embodiment of the present disclosure, the sub-pixels are tightly arranged to improve the resolution of the display panel comprising the pixel array as much as possible.

In the embodiment of the present disclosure, the specific arrangement of the sub-pixels of different colors is not specially limited as long as the sub-pixels of different colors in the pixel array can be uniformly distributed.

In order to provide signals for the sub-pixels in the pixel array conveniently, in the first embodiment of the pixel array provided by the embodiment of the present disclosure, as illustrated in FIG. 1, a sub-pixel period is formed by five rows of sub-pixels. The first row of sub-pixels in the sub-pixel period include a plurality of first sub-pixel sub-periods; each first sub-pixel sub-period includes a G sub-pixel, a B sub-pixel and an R sub-pixel arranged in sequence; the second row of sub-pixels in the sub-pixel period include a plurality of second sub-pixel sub-periods; each second sub-pixel sub-period includes an R sub-pixel, a G sub-pixel and a B sub-pixel arranged in sequence; the third row of sub-pixels in the sub-pixel period include a plurality of third sub-pixel sub-periods; each third sub-pixel sub-period includes an R sub-pixel, a G sub-pixel and a B sub-pixel arranged in sequence; the fourth row of sub-pixels in the sub-pixel period include a plurality of fourth sub-pixel sub-periods; each fourth sub-pixel sub-period includes a B sub-pixel, an R sub-pixel and a G sub-pixel arranged in sequence; the fifth row of sub-pixels in the sub-pixel period include a plurality of fifth sub-pixel sub-periods; and each fifth sub-pixel sub-period includes a G sub-pixel, a B sub-pixel and an R sub-pixel arranged in sequence.

It should be understood that in the embodiment of the present disclosure, a "row of sub-pixels" refers to sub-pixels of which center points are disposed on the same row; and in the embodiment of the present disclosure, a column of sub-pixels refers to sub-pixels of which center points are disposed on the same column.

In the pixel array provided by the first embodiment, the mutual positional relationship among the plurality of sub-pixels is defined as follows:

A horizontal axis and a vertical axis are provided on a plane; horizontal coordinates $x=R(1), R(2), R(3) \ldots R(N)$ are sequentially arranged from left to right; the distance between adjacent horizontal coordinates is d; vertical coordinates $y=L(1), L(2), L(3) \ldots L(n)$ are sequentially arranged from the top down; the distance between adjacent vertical coordinates is also d, namely the distance between the adjacent horizontal coordinates is equal to the distance between the adjacent vertical coordinates; and the horizontal coordinates of the sub-pixels are as follows:

as for an $L(1+5i_1)^{th}$ row, centers of the sub-pixels are disposed at positions, the horizontal coordinates of which are $R(4+5k_1)$, $i_1$ being an integer not less than zero, and $k_1$ being an integer not less than zero;

as for an $L(2+5i_2)^{th}$ row, centers of the sub-pixels are disposed at positions, the horizontal coordinates of which are $R(2+5k_2)$, $i_2$ being an integer not less than zero, and $k_2$ being an integer not less than zero;

as for an $L(3+5i_3)^{th}$ row, centers of the sub-pixels are disposed at positions, the horizontal coordinates of which are $R(5+5k_3)$, $i_3$ being an integer not less than zero, and $k_3$ being an integer not less than zero;

as for an $L(4+5i_4)^{th}$ row, centers of the sub-pixels are disposed at positions, the horizontal coordinates of which are $R(3+5k_4)$, $i_4$ being an integer not less than zero, and $k_4$ being an integer not less than zero; and as for an $L(5+5i_5)^{th}$ row, centers of the sub-pixels are disposed at positions, the horizontal coordinates of which are $R(1+5k_5)$, $i_5$ being an integer not less than zero, and $k_5$ being an integer not less than zero.

Taking FIG. 1 as an example, the horizontal coordinates of the centers of the $L(1)^{th}$ row (namely $i_1=0$) of sub-pixels are sequentially $R(4)$ ($k_1=0$), $R(9)$ ($k_1=1$), $R(14)$ ($k_1=2$) and $R(19)$ ($k_1=3$); the horizontal coordinates of the centers of the $L(2)^{th}$ row (namely $i_2=0$) of sub-pixels are sequentially $R(2)$ ($k_2=0$), $R(7)$ ($k_2=1$), $R(12)$ ($k=2$) and $R(17)$ ($k_2=3$); the horizontal coordinates of the centers of the $L(3)^{th}$ row (namely $i_3=0$) of sub-pixels are sequentially $R(5)$ ($k_3=0$), $R(10)$ ($k_3=1$), $R(15)$ ($k_3=2$) and $R(20)$ ($k_3=3$); the horizontal coordinates of the centers of the $L(4)^{th}$ row (namely $i_4=0$) of sub-pixels are sequentially $R(3)$ ($k_4=0$), $R(8)$ ($k_4=1$), $R(13)$ ($k_4=2$) and $R(18)$ ($k_4=3$); and the horizontal coordinates of the centers of the $L(5)^{th}$ row (namely $i_5=0$) of sub-pixels are sequentially $R(1)$ ($k_4=0$), $R(6)$ ($k_4=1$), $R(11)$ ($k_4=2$) and $R(16)$ ($k_4=3$).

In the second embodiment of the pixel array provided by the embodiment of the present disclosure, the pixel array may have the array as illustrated in FIG. 3. That is to say, as illustrated in FIG. 3, a sub-pixel period is formed by three rows of sub-pixels; the first row of sub-pixels in the sub-pixel period are all R sub-pixels; the second row of sub-pixels in the sub-pixel period are all B sub-pixels; and the third row of sub-pixels in the sub-pixel period are all G sub-pixels.

In the pixel array provided by the second embodiment, the mutual positional relationship among the plurality of sub-pixels is defined as follows:

A horizontal axis and a vertical axis are provide on a plane; horizontal coordinates x=R(1), R(2), R(3) . . . R(N) are sequentially arranged from left to right; the distance between adjacent horizontal coordinates is d; vertical coordinates y=L(1), L(2), L(3) . . . L(n) are sequentially arranged from the top down; the distance between adjacent vertical coordinates is also d, namely the distance between the adjacent horizontal coordinates is equal to the distance between the adjacent vertical coordinates; and the horizontal coordinates of the sub-pixels are as follows:

as for an $L(1+5m_1)^{th}$ row, centers of the sub-pixels are disposed at positions, the horizontal coordinates of which are $R(1+5n_1)$, $m_1$ being an integer not less than zero, $n_1$ being an integer not less than zero;

as for an $L(2+5m_2)^{th}$ row, centers of the sub-pixels are disposed at positions, the horizontal coordinates of which are $R(4+5n_2)$, $m_2$ being an integer not less than zero, $n_2$ being an integer not less than zero;

as for an $L(3+5m_3)^{th}$ row, centers of the sub-pixels are disposed at positions, the horizontal coordinates of which are $R(2+5n_3)$, $m_3$ being an integer not less than zero, $n_3$ being an integer not less than zero;

as for an $L(4+5m_4)^{th}$ row, centers of the sub-pixels are disposed at positions, the horizontal coordinates of which are $R(5+5n_4)$, $m_4$ being an integer not less than zero, $n_4$ being an integer not less than zero; and as for an $L(5+5m_5)^{th}$ row, centers of the sub-pixels are disposed at positions, the horizontal coordinates of which are $R(3+5n_5)$, $m_5$ being an integer not less than zero, $n_5$ being an integer not less than zero.

Taking FIG. 3 as an example, the horizontal coordinates of the centers of the $L(1)^{th}$ row (namely $m_1$=0) of sub-pixels are sequentially R(1) ($n_1$=0), R(6) ($n_1$=1), R(11) ($n_1$=2) and R(16) ($n_1$=3); the horizontal coordinates of the centers of the $L(2)^{th}$ row (namely $m_2$=0) of sub-pixels are sequentially R(4) ($n_2$=0), R(9) ($n_2$=1), R(14) ($n_2$=2) and R(19) ($n_2$=3); the horizontal coordinates of the centers of the $L(3)^{th}$ row (namely $m_3$=0) of sub-pixels are sequentially R(2) ($n_3$=0), R(7) ($n_3$=1), R(12) ($n_3$=2) and R(17) ($n_3$=3); the horizontal coordinates of the centers of the $L(4)^{th}$ row (namely $m_4$=0) of sub-pixels are sequentially R(5) ($n_3$=0), R(10) ($n_3$=1), R(15) ($n_3$=2) and R(20) ($n_3$=3); and the horizontal coordinates of the centers of the $L(5)^{th}$ row (namely $m_5$=0) of sub-pixels are sequentially R(3) ($n_3$=0), R(8) ($n_3$=1), R(13) ($n_3$=2) and R(18) ($n_3$=3).

In another aspect, at least one embodiment of the present disclosure provides a display panel. The display panel comprises a pixel array, a plurality of data lines and a plurality of gate lines. The pixel array is the pixel array provided by an embodiment of the present disclosure.

Figure 4:
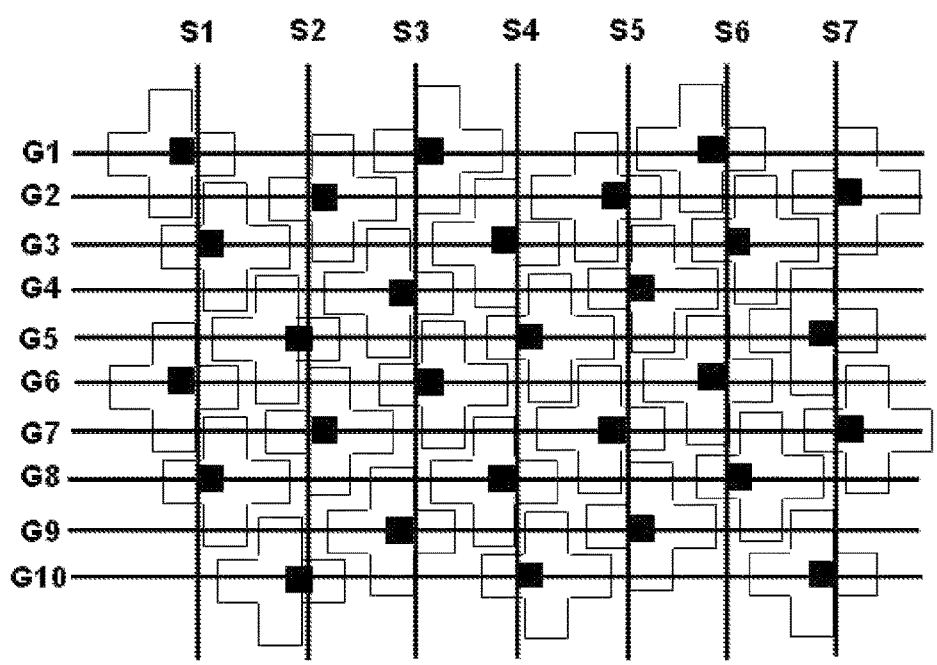
FIG. 4 is a schematic diagram illustrating the connection relationship between gate lines, data lines and sub-pixels in the display panel provided by an embodiment of the present disclosure.

The data lines are used for providing gray-scale signals for the sub-pixels in the pixel array, and the gate lines are used for providing scanning signals for the sub-pixels in the pixel array. As illustrated in FIG. 4, the same row of sub-pixels share one gate line. Therefore, the pixel array provided by an embodiment of the present disclosure also adopts a progressive scanning manner. The figure illustrates 10 gate lines from G1 to G10.

In the embodiment of the present disclosure, the specific type of the display panel is not specially limited. For instance, the display panel may be an OLED panel and may also be an LCD panel, etc. If the display panel is an OLED panel, each sub-pixel in the pixel array corresponds to a light-emitting member in the display panel. If the display panel is an LCD panel, the sub-pixel corresponds to an opening on the display panel; common electrodes or pixel electrodes of the display panel may be cross-shaped; and color filters on a color filter substrate are also cross-shaped.

In an embodiment of the present disclosure, as the sub-pixels are tightly arranged, the spacing between center points of two adjacent columns of sub-pixels is relatively small. For the convenient arrangement of the data lines, two columns of sub-pixels may be disposed above one data line. Of course, the embodiment of the present disclosure is not limited thereto. For instance, one column of sub-pixels may also be disposed above one data line, so that the sub-pixels in the pixel array can all receive gray-scale signals.

As illustrated in FIG. 4, a data line S1 is configured to provide gray-scale signals (namely brightness signals) for sub-pixels corresponding to a gate line G1, a gate line G3, a gate line G6, and a gate line G8; a data line S2 is configured to provide gray-scale signals for sub-pixels corresponding to a gate line G2, a gate line G5, a gate line G7, and a gate line G10; a data line S3 is configured to provide gray-scale signals for sub-pixels corresponding to the gate line G1, a gate line G4, the gate line G6, and a gate line G9; a data line S4 is configured to provide gray-scale signals for sub-pixels corresponding to the gate line G3, the gate line G5, the gate line G8, and the gate line G10; a data line S5 is configured to provide gray-scale signals for sub-pixels corresponding to the gate line G2, the gate line G4, the gate line G7, and the gate line G9; a data line S6 is configured to provide gray-scale signals for sub-pixels corresponding to the gate line G1, the gate line G3, the gate line G6, and the gate line G8; and a data line S7 is configured to provide gray-scale signals for sub-pixels corresponding to the gate line G2, the gate line G5, the gate line G7, and the gate line G10.

Figure 5:
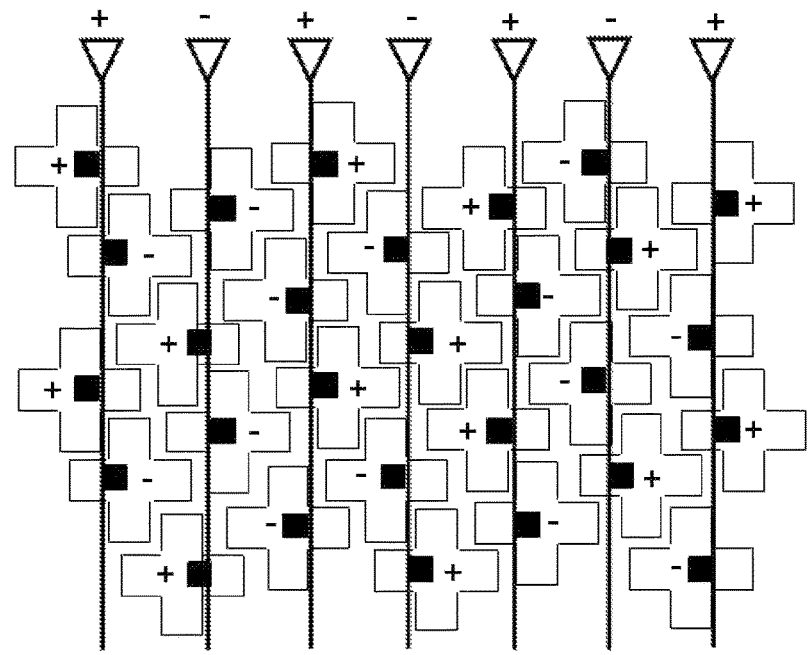
FIG. 5 is a schematic diagram illustrating signal inversion in the display panel provided by an embodiment of the present disclosure.

As described above, the display panel may be an LCD panel. As the sub-pixels are cross-shaped, the sub-pixels in two adjacent rows of sub-pixels are respectively disposed in different columns. Therefore, in one embodiment, as illustrated in FIG. 5, in the LCD panel, signal inversion may be introduced by way of point inversion. That is to say, in a case where the display panel is used for display, voltage signals provided by two adjacent data lines have opposite polarities, so that the voltage formed between a common electrode and a pixel electrode has opposite polarities between two sub-pixels in two adjacent rows and above the same data line.

In still another aspect, at least one embodiment of the present disclosure further provides a method for driving the pixel array. In the method for driving the pixel array, as illustrated in FIGS. 1 to 3, the pixel array includes a plurality of real sub-pixel units; each real sub-pixel unit includes three real sub-pixels of different colors; the three real sub-pixels are respectively a real R sub-pixel, a real G sub-pixel and a real B sub-pixel; in each pixel unit, a triangle is formed by connecting lines of center points of the three real sub-pixels; and each real sub-pixel is cross-shaped. The driving method comprises the following steps S1 to S3. Detailed description will be given below to the steps S1 to S3.

Figure 6:
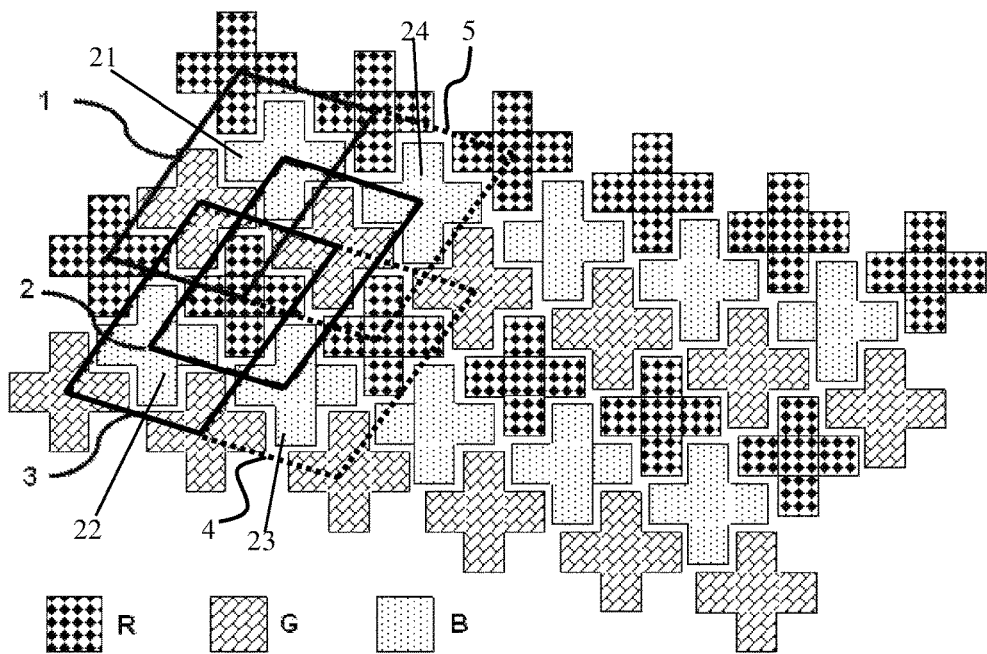
FIG. 6 is a schematic diagram illustrating the share relationship between sub-pixels of three colors when the pixel array is driven by the driving method provided by the embodiment of the present disclosure.
Figure 7:
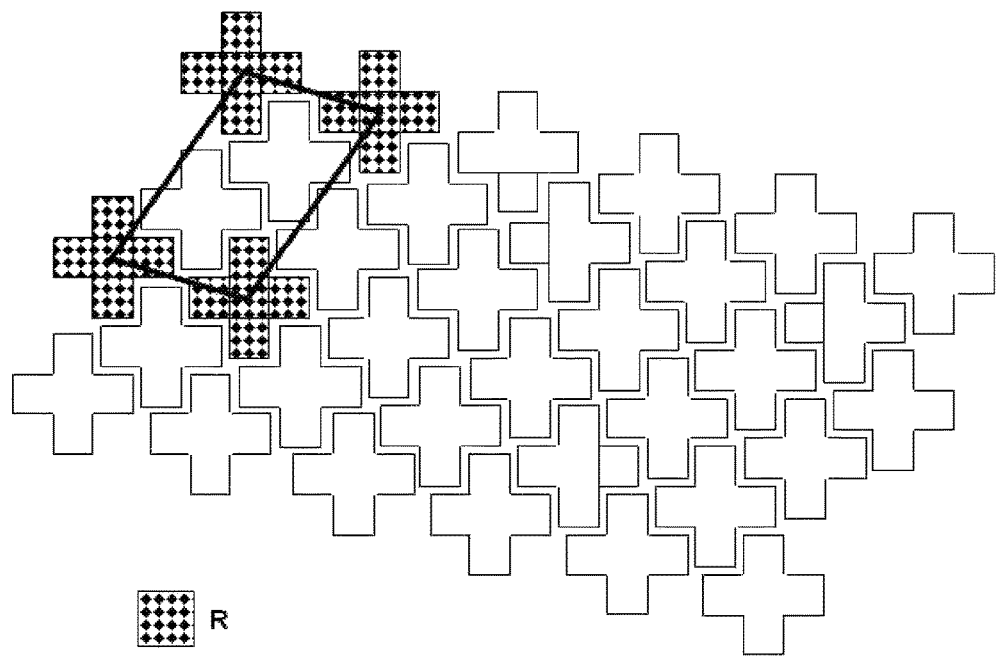
FIG. 7 is a schematic diagram illustrating the share relationship between R sub-pixels when the pixel array is driven by the driving method provided by an embodiment of the present disclosure.
Figure 8:
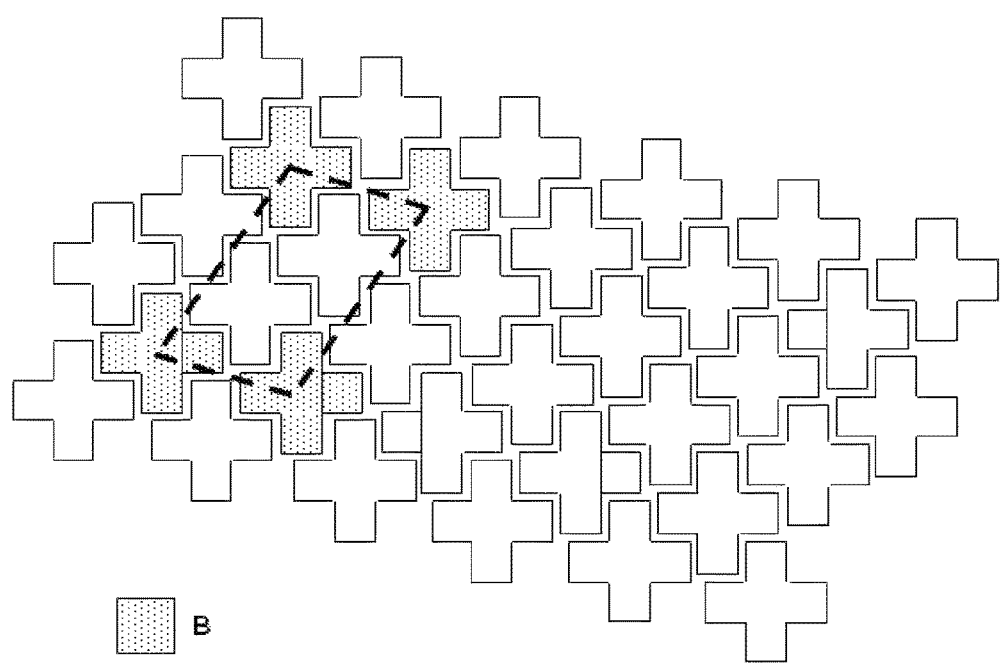
FIG. 8 is a schematic diagram illustrating the share relationship between B sub-pixels when the pixel array is driven by the driving method provided by an embodiment of the present disclosure.
Figure 9:
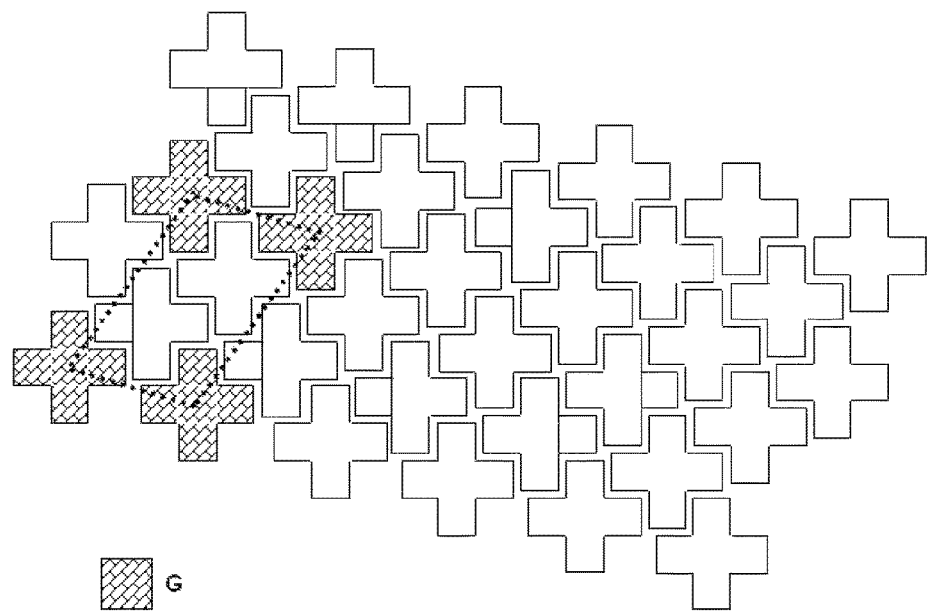
FIG. 9 is a schematic diagram illustrating the share relationship between G sub-pixels when the pixel array is driven by the driving method provided by an embodiment of the present disclosure.

S1: dividing an image to be displayed into a plurality of theoretical pixel units, in which each theoretical pixel unit includes three theoretical sub-pixels of different colors, and the three theoretical sub-pixels are respectively a theoretical R sub-pixel, a theoretical G sub-pixel and a theoretical B sub-pixel (for instance, parallelogrammic regions 1, 2, 3 as illustrated in FIG. 6 represent the theoretical R sub-pixels, the theoretical B sub-pixels and the theoretical G sub-pixels respectively); and calculating the theoretical brightness value of each theoretical sub-pixel.

S2: calculating actual brightness values of the real sub-pixels, in which the brightness value of a real sub-pixel to be calculated is the sum of at least a part of the theoretical brightness value of the theoretical sub-pixel corresponding to the real sub-pixel to be calculated and a part of the theoretical brightness value of a theoretical sub-pixel corresponding to at least one sharing real sub-pixel; the sharing real sub-pixel has the same color as the real sub-pixel to be calculated; and a connecting line of center points of the sharing real sub-pixel and the real sub-pixel to be calculated does not run through other real sub-pixels having the same color as the real sub-pixel to be calculated.

S3: inputting signals into the real sub-pixels, so that the real sub-pixels have the actual brightness value calculated in the step S2.

The shape of the theoretical pixel unit may be the same as that of a pixel unit in a common pixel array. For instance, the theoretical pixel unit may be of a square, and a plurality of theoretical pixel units are arranged into a matrix including a plurality of rows and a plurality of columns.

In the driving method provided by an embodiment of the present disclosure, the size of the theoretical pixel unit is not specifically limited in the step S1 as long as the theoretical sub-pixel in the theoretical pixel unit may correspond to the real sub-pixel. Detailed description will be given below with respect to the phrase "theoretical sub-pixel corresponding to the real sub-pixel to be calculated" in the step S2. Position coordinates of center points of the theoretical sub-pixels in the theoretical pixel units in an image to be displayed may be calculated, and hence position coordinates of center points of the real sub-pixels in the image to be displayed may be calculated. If the position coordinates of the center points of the real sub-pixels are close to or overlapped with the position coordinates of the center points of the theoretical sub-pixels, it is deemed that the position of the real sub-pixel corresponds to that of the theoretical sub-pixel.

If the pixel array provided by the embodiment of the present disclosure is driven by the driving method provided by an embodiment of the present disclosure, the actual brightness of each real sub-pixel includes at least a part of the theoretical brightness value of a theoretical sub-pixel corresponding to the real sub-pixel and a part of the theoretical brightness value of theoretical sub-pixel(s) corresponding to the sharing real sub-pixel(s), and the effect is equivalent to the case that, when one real sub-pixel outputs a brightness, it shares the brightness value of the real sub-pixels surrounding this real sub-pixel. Therefore, the visual resolution of the display panel comprising the pixel array can be higher than the physical resolution thereof, and more information can be outputted through sharing between real sub-pixels.

As described above, the sharing real sub-pixel used in the process of calculating the actual brightness value of a real sub-pixel includes the real sub-pixel having the same color as the real sub-pixel to be calculated, and a connecting line of center points of the sharing real sub-pixel and the real sub-pixel to be calculated does not run through other real sub-pixels having the same color as the real sub-pixel to be calculated. In the process of calculating the actual brightness of a real sub-pixel, the brightness value of one sharing real sub-pixel may be utilized, or the brightness value of a plurality of sharing real sub-pixels may also be utilized.

In one embodiment of the present disclosure, in the step S2, connecting lines of a center point of the real sub-pixel to be calculated and center points of the sharing real sub-pixels corresponding to the real sub-pixel to be calculated may form a parallelogrammic, as illustrated in FIGS. 6 to 12. The embodiments of the present disclosure are not limited thereto.

Detailed description will be given below to the step S2 with reference to FIG. 6 by taking the case that the connecting lines of the center points of the real sub-pixel to be calculated and the sharing real sub-pixels forms a parallelogrammic and the brightness value of a plurality of sharing real sub-pixels is utilized in the process of calculating the actual brightness value of a real sub-pixel as an example.

For instance, a real B sub-pixel 21 in FIG. 6 is a real sub-pixel to be calculated. As real B sub-pixels 22, 23 and 24 have the same color as the real B sub-pixel 21 and connecting lines of center points of the real B sub-pixels 21, 22, 23 and 24 do not run through other real B sub-pixels, the real B sub-pixels 22, 23 and 24 are the sharing real sub-pixels. The theoretical sub-pixel corresponding to the real B sub-pixel 21 to be calculated may be the theoretical sub-pixel represented by the parallelogram 1 (referred to as a theoretical sub-pixel 1), and the theoretical sub-pixels corresponding to the sharing real sub-pixels 22, 23 and 24 may be the theoretical sub-pixels represented by parallelograms 3, 4 and 5 (referred to as theoretical sub-pixels 3, 4 and 5 respectively). Taking the case that the real B sub-pixel 21 to be calculated utilizes all the sharing real sub-pixels 22, 23 and 24 as an example, the brightness value of the real B sub-pixel 21 to be calculated includes: at least a part of the theoretical brightness value of the theoretical sub-pixel 1 and a part of the theoretical brightness value of the theoretical sub-pixels 3, 4 and 5. For instance, the calculated brightness value of the real B sub-pixel 21 may be the brightness value of a polygonal region encircled by the parallelograms 1, 2 and 3 (namely a region encircled by solid lines in FIG. 6). Of course, the embodiment of the present disclosure is not limited thereto.

As illustrated in FIG. 6, connecting lines of a center point of a real R sub-pixel to be calculated and center points of sharing real sub-pixels of the R sub-pixel to be calculated are combined to form a first parallelogram 1; connecting lines of a center point of a real B sub-pixel to be calculated and center points of sharing real sub-pixels of the B sub-pixel to be calculated are combined to form a second parallelogram 2; and connecting lines of a center point of a real G sub-pixel to be calculated and center points of sharing real sub-pixels of the G sub-pixel to be calculated are combined to form a third parallelogram 3. The first parallelogram 1 is an R output area; the second parallelogram 2 is a B output area; and the third parallelogram 3 is a G output area. Required colors may be obtained by adjusting the brightness of red outputted in the R output area, the brightness of blue outputted in the B output area, and the brightness of green outputted in the G output area.

In the embodiment of the present disclosure, real sub-pixels, outputting brightness actually, in various color output areas are not limited. The real sub-pixel outputting brightness actually may be any one of four real sub-pixels at four vertexes of a color output area. In one embodiment of the present disclosure, in the R output area, the real sub-pixel outputting brightness actually may be a real R sub-pixel on the top in the R output area, and the other three real R sub-pixels are sharing real sub-pixels; in the B output area, the real sub-pixel outputting brightness actually may be a real B sub-pixel on the top in the B output area, and the other three real B sub-pixels are sharing real sub-pixels; and in the G output area, the real sub-pixel outputting brightness actually may be a real G sub-pixel on the top in the G output area, and the other three real G sub-pixels are sharing real sub-pixels.

The pixel array in the method for driving the pixel array, provided by an embodiment of the present disclosure, is the pixel array provided by an embodiment of the present disclosure. Therefore, the real sub-pixels in the pixel array may be arranged according to two embodiments in FIGS. 1 and 3. In the two embodiments as illustrated in FIGS. 1 and 3, real sub-pixels of different colors are alternately arranged, so that the pixel array can be arranged integrally and uniformly, and hence the pixel sharing modes as illustrated in FIGS. 6 to 12 can be achieved (that is to say, connecting lines of a center point of a real sub-pixel to be calculated and center points of sharing real sub-pixels of the real sub-pixel to be calculated are combined to form a parallelogram).

Figure 10:
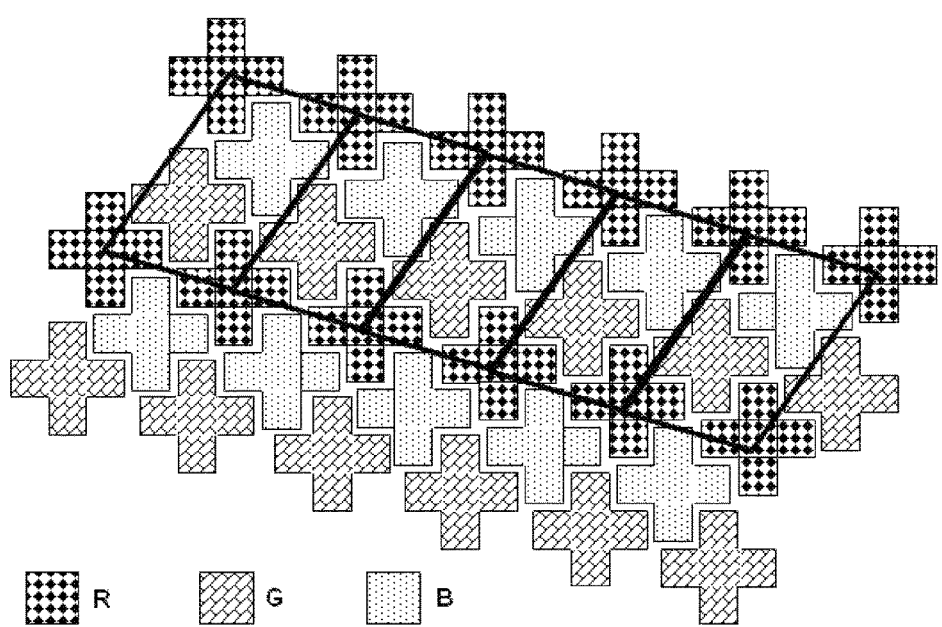
FIG. 10 is an arrangement diagram of red output areas when the pixel array provided by the embodiment of the present disclosure outputs red.
Figure 11:
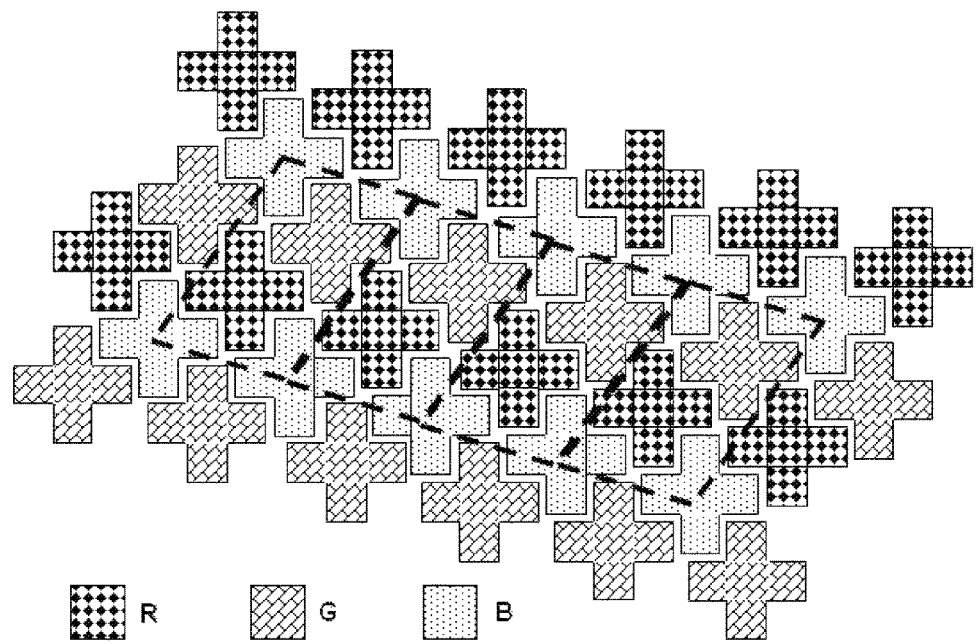
FIG. 11 is an arrangement diagram of blue output areas when the pixel array provided by the embodiment of the present disclosure outputs blue.
Figure 12:
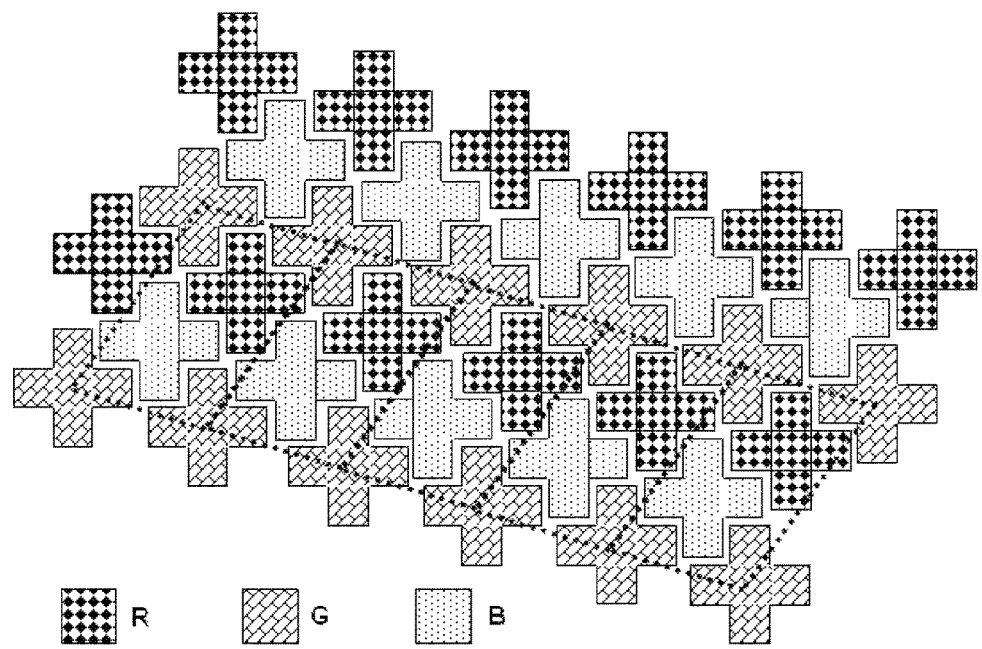
FIG. 12 is an arrangement diagram of green output areas when the pixel array provided by the embodiment of the present disclosure outputs green.

As illustrated in FIGS. 10 to 12, the color output areas are arranged periodically. As illustrated in FIG. 10, a plurality of R output areas are arranged to form a parallelogram, and two adjacent R output areas share one side; as illustrated in FIG. 11, a plurality of B output areas are arranged to form a parallelogram, and two adjacent B output areas share one side; and as illustrated in FIG. 12, a plurality of G output areas are arranged to form a parallelogram, and two adjacent G output areas share one side.

The method for driving the pixel array, provided by the embodiment of the present disclosure, is applicable to the pixel array having the structure as illustrated in FIG. 1. In the pixel array as illustrated in FIG. 1, a sub-pixel period is formed by five rows of sub-pixels. That is to say, in the method for driving the pixel array, provided by the embodiment of the present disclosure, a sub-pixel period is formed by five rows of real sub-pixels in the pixel array. The first row of real sub-pixels in the sub-pixel period include a plurality of first sub-pixel sub-periods; each first sub-pixel sub-period includes a real G sub-pixel, a real B sub-pixel and a real R sub-pixel arranged in sequence; the second row of real sub-pixels in the sub-pixel period include a plurality of second sub-pixel sub-periods; each second sub-pixel sub-period includes a real R sub-pixel, a real G sub-pixel and a real B sub-pixel arranged in sequence; the third row of real sub-pixels in the sub-pixel period include a plurality of third sub-pixel sub-periods; each third sub-pixel sub-period includes a real R sub-pixel, a real G sub-pixel and a real B sub-pixel arranged in sequence; the fourth row of real sub-pixels in the sub-pixel period include a plurality of fourth sub-pixel sub-periods; each fourth sub-pixel sub-period includes a real B sub-pixel, a real R sub-pixel and a real G sub-pixel arranged in sequence; and the fifth row of real sub-pixels in the sub-pixel period include a plurality of fifth sub-pixel sub-periods; and each fifth sub-pixel sub-period includes a real G sub-pixel, a real B sub-pixel and a real R sub-pixel arranged in sequence.

In one embodiment, the mutual positional relationship between the plurality of real sub-pixels in the pixel array as illustrated in FIG. 1 is defined as follows:

A horizontal axis and a vertical axis are provide on a plane; horizontal coordinates x=R(1), R(2), R(3) . . . R(N) are sequentially arranged from left to right; the distance between adjacent horizontal coordinates is d; vertical coordinates y=L(1), L(2), L(3) . . . L(n) are sequentially arranged from the top down; the distance between adjacent vertical coordinates is also d, namely the distance between the adjacent horizontal coordinates is equal to the distance between the adjacent vertical coordinates; and the horizontal coordinates of the real sub-pixels are as follows:

as for an $L(1+5i_1)^{th}$ row, centers of the real sub-pixels are disposed at positions, the horizontal coordinates of which are $R(4+5k_1)$, $i_1$ being an integer not less than zero, and $k_1$ being an integer not less than zero;

as for an $L(2+5i_2)^{th}$ row, centers of the real sub-pixels are disposed at positions, the horizontal coordinates of which are $R(2+5k_2)$, $i_2$ being an integer not less than zero, and $k_2$ being an integer not less than zero;

as for an $L(3+5i_3)^{th}$ row, centers of the real sub-pixels are disposed at positions, the horizontal coordinates of which are $R(5+5k_3)$, $i_3$ being an integer not less than zero, and $k_3$ being an integer not less than zero;

as for an $L(4+5i_4)^{th}$ row, centers of the real sub-pixels are disposed at positions, the horizontal coordinates of which are $R(3+5k_4)$, $i_4$ being an integer not less than zero, and $k_4$ being an integer not less than zero; and as for an $L(5+5i_5)^{th}$ row, centers of the real sub-pixels are disposed at positions, the horizontal coordinates of which are $R(1+5k_5)$, $i_5$ being an integer not less than zero, and $k_5$ being an integer not less than zero.

The method for driving the pixel array, provided by the embodiment of the present disclosure is also applicable to the pixel array as illustrated in FIG. 3. That is to say, in the pixel array in the method for driving the pixel array, provided by the embodiment, a sub-pixel period is formed by three rows of real sub-pixels; the first row of real sub-pixels in the sub-pixel period are all real R sub-pixels; the second row of real sub-pixels in the sub-pixel period are all real B sub-pixels; and the third row of real sub-pixels in the sub-pixel period are all real G sub-pixels.

In one embodiment, the mutual positional relationship between the plurality of real sub-pixels in the pixel array as illustrated in FIG. 3 is defined as follows:

a horizontal axis and a vertical axis are provide on a plane; horizontal coordinates x=R(1), R(2), R(3) . . . R(N) are sequentially arranged from left to right; the distance between adjacent horizontal coordinates is d; vertical coordinates y=L(1), L(2), L(3) . . . L(n) are sequentially arranged from the top down; the distance between adjacent vertical coordinates is also d, namely the distance between the adjacent horizontal coordinates is equal to the distance between the adjacent vertical coordinates; and the horizontal coordinates of the real sub-pixels are as follows:

as for an $L(1+5m_1)^{th}$ row, centers of the real sub-pixels are disposed at positions, the horizontal coordinates of which are $R(1+5n_1)$, $m_1$ being an integer not less than zero, $n_1$ being an integer not less than zero;

as for an $L(2+5m_2)^{th}$ row, centers of the real sub-pixels are disposed at positions, the horizontal coordinates of which are $R(4+5n_2)$, $m_2$ being an integer not less than zero, $n_2$ being an integer not less than zero;

as for an $L(3+5m_3)^{th}$ row, centers of the real sub-pixels are disposed at positions, the horizontal coordinates of which are $R(2+5n_3)$, $m_3$ being an integer not less than zero, $n_3$ being an integer not less than zero;

as for an $L(4+5m_4)^{th}$ row, centers of the real sub-pixels are disposed at positions, the horizontal coordinates of which are $R(5+5n_4)$, $m_4$ being an integer not less than zero, $n_4$ being an integer not less than zero; and as for an $L(5+5m_5)^{th}$ row, centers of the real sub-pixels are disposed at positions, the horizontal coordinates of which are $R(3+5n_5)$, $m_5$ being an integer not less than zero, $n_5$ being an integer not less than zero.

When the pixel array provided by the embodiment of the present disclosure is driven by the method for driving the pixel array, provided by the embodiment of the present disclosure, the visual resolution of the display panel comprising the pixel array may be higher than the physical resolution of the display panel.

In summary, in the pixel array provided by the embodiment of the present disclosure, the driving method thereof and the display panel, as each sub-pixel is cross-shaped, the sub-pixels in the pixel array may be tightly arranged, so that the display panel comprising the pixel array can have a high physical resolution. When the pixel array is driven by the driving method provided by the embodiment of the present disclosure, the brightness output area of the pixel array can become larger, so that the visual resolution of the display panel comprising the pixel array can be higher than the physical resolution of the display panel comprising the pixel array.

It should be understood that the above embodiments are only preferred embodiments for the objective of illustrating the principle of the present disclosure, but the present disclosure is not limited thereto. Various modifications and improvements may be made by those skilled in the art without departing from the spirit and the essence of the present disclosure and shall also fall within the scope of protection of the present disclosure.

The application claims priority to the Chinese patent application No. 201410317831.1, filed Jul. 4, 2014, the disclosure of which is incorporated herein by reference as part of the application.

The invention claimed is:

1. A pixel array, comprising: a plurality of pixel units, wherein
   each pixel unit includes three sub-pixels of different colors; the three sub-pixels are respectively a red (R) sub-pixel, a green (G) sub-pixel and a blue (B) sub-pixel;
   in each pixel unit, a triangle is formed by connecting lines of center points of the three sub-pixels; each sub-pixel is in a shape of crisscross; the crisscross is formed by rectangles with a length-width ratio of 3:1 in a horizontal direction and a vertical direction respectively; and a length of the crisscross in the horizontal direction is equal to a length of the crisscross in the vertical direction; and
   wherein a sub-pixel period is formed by five rows of sub-pixels;
   a first row of sub-pixels in the sub-pixel period include a plurality of first sub-pixel sub-periods; each first sub-pixel sub-period include a G sub-pixel, a B sub-pixel and an R sub-pixel arranged in sequence;
   a second row of sub-pixels in the sub-pixel period include a plurality of second sub-pixel sub-periods; each second sub-pixel sub-period include an R sub-pixel, a G sub-pixel and a B sub-pixel arranged in sequence;
   a third row of sub-pixels in the sub-pixel period include a plurality of third sub-pixel sub-periods; each third sub-pixel sub-period include an R sub-pixel, a G sub-pixel and a B sub-pixel arranged in sequence;
   a fourth row of sub-pixels in the sub-pixel period include a plurality of fourth sub-pixel sub-periods; each fourth sub-pixel sub-period include a B sub-pixel, an R sub-pixel and a G sub-pixel arranged in sequence; and
   a fifth row of sub-pixels in the sub-pixel period include a plurality of fifth sub-pixel sub-periods; and each fifth sub-pixel sub-period include a G sub-pixel a B sub-pixel and an R sub-pixel arranged in sequence.

2. The pixel array according to claim 1, wherein a mutual positional relationship among sub-pixels is defined as follows:
   a horizontal axis and a vertical axis are provide on a plane; horizontal coordinates $x=R(1), R(2), R(3) \ldots R(N)$ are sequentially arranged from left to right; vertical coordinates $y=L(1), L(2), L(3) \ldots L(n)$ are sequentially arranged from the top down; a distance between adjacent horizontal coordinates is equal to a distance between adjacent vertical coordinates; and the horizontal coordinates of the sub-pixels are as follows:
   as for an $L(1+5i_1)^{th}$ row, centers of the sub-pixels are disposed at positions, the horizontal coordinates of which are $R(4+5k_1)$, $i_1$ being an integer not less than zero, and $k_1$ being an integer not less than zero;
   as for an $L(2+5i_2)^{th}$ row, centers of the sub-pixels are disposed at positions, the horizontal coordinates of which are $R(2+5k_2)$, $i_2$ being an integer not less than zero, and $k_2$ being an integer not less than zero;
   as for an $L(3+5i_3)^{th}$ row, centers of the sub-pixels are disposed at positions, the horizontal coordinates of which are $R(5+5k_3)$, $i_3$ being an integer not less than zero, and $k_3$ being an integer not less than zero;
   as for an $L(4+5i_4)^{th}$ row, centers of the sub-pixels are disposed at positions, the horizontal coordinates of which are $R(3+5k_4)$, $i_4$ being an integer not less than zero, and $k_4$ being an integer not less than zero; and
   as for an $L(5+5i_5)^{th}$ row, centers of the sub-pixels are disposed at positions, the horizontal coordinates of which are $R(1+5k_5)$, $i_5$ being an integer not less than zero, and $k_5$ being an integer not less than zero.

3. A display panel, comprising: a pixel array, a plurality of data lines and a plurality of gate lines, wherein the pixel array is the pixel array according to claim 1.

4. The display panel according to claim 3, wherein two columns of sub-pixels are disposed above one data line.

5. The display panel according to claim 3, wherein the display panel is a liquid crystal display (LCD) panel or an organic light-emitting diode (OLED) display panel.

6. The display panel according to claim 3, wherein in a case where the display panel is used for display, voltage signals provided by two adjacent data lines have opposite polarities, so that voltage formed between a common electrode and a pixel electrode has an opposite polarity between two sub-pixels in two adjacent rows and above the same data line.

7. A method for driving a pixel array, wherein
   the pixel array includes a plurality of real sub-pixel units; each real sub-pixel includes three real sub-pixels of different colors; the three real sub-pixels are respectively a real R sub-pixel, a real G sub-pixel and a real B sub-pixel; in each pixel unit, a triangle is formed by connecting lines of center points of the three real sub-pixels; each real sub-pixel is in a shape of crisscross; the crisscross is formed by rectangles with a length-width ratio of 3:1 in a horizontal direction and a vertical direction respectively; a length of the crisscross in the horizontal direction is equal to a length of the crisscross in the vertical direction; and the driving method comprises:
   S1: dividing an image to be displayed into a plurality of theoretical pixel units, in which each theoretical pixel unit includes three theoretical sub-pixels of different colors, and the three theoretical sub-pixels are respectively a theoretical R sub-pixel, a theoretical G sub-pixel and a theoretical B sub-pixel; and calculating a theoretical brightness value of each theoretical sub-pixel;

S2: calculating actual brightness values of the real sub-pixels, in which a brightness value of a real sub-pixel to be calculated is a sum of at least a part of a theoretical brightness value of a theoretical sub-pixel corresponding to the real sub-pixel to be calculated and a part of a theoretical brightness value of a theoretical sub-pixel corresponding to at least one sharing real sub-pixel; the sharing real sub-pixel has the same color as the real sub-pixel to be calculated; and a connecting line of the sharing real sub-pixel and the real sub-pixel to be calculated does not run through other real sub-pixels having the same color as the real sub-pixel to be calculated; and S3: inputting signals into the real sub-pixels, so that the real sub-pixels have the actual brightness value calculated in the step S2.

8. The method for driving the pixel array according to claim 7, wherein in the step S2, connecting lines of a center point of the real sub-pixel to be calculated and center points of the sharing real sub-pixels corresponding to the real sub-pixel to be calculated are combined to form a parallelogram.

9. The method for driving the pixel array according to claim 7, wherein a sub-pixel period is formed by five rows of real sub-pixels;
   a first row of real sub-pixels in the sub-pixel period include a plurality of first sub-pixel sub-periods; each first sub-pixel sub-period includes a real G sub-pixel, a real B sub-pixel and a real R sub-pixel arranged in sequence;
   a second row of real sub-pixels in the sub-pixel period include a plurality of second sub-pixel sub-periods; each second sub-pixel sub-period includes a real R sub-pixel, a real G sub-pixel and a real B sub-pixel arranged in sequence;
   a third row of real sub-pixels in the sub-pixel period include a plurality of third sub-pixel sub-periods; each third sub-pixel sub-period includes a real R sub-pixel, a real G sub-pixel and a real B sub-pixel arranged in sequence;
   a fourth row of real sub-pixels in the sub-pixel period include a plurality of fourth sub-pixel sub-periods; each fourth sub-pixel sub-period includes a real B sub-pixel, a real R sub-pixel and a real G sub-pixel arranged in sequence; and
   a fifth row of real sub-pixels in the sub-pixel period include a plurality of fifth sub-pixel sub-periods; and each fifth sub-pixel sub-period includes a real G sub-pixel, a real B sub-pixel and a real R sub-pixel arranged in sequence.

10. The method for driving the pixel array according to claim 9, wherein a mutual positional relationship between real sub-pixels is defined as follows:
   a horizontal axis and a vertical axis are provide on a plane; horizontal coordinates x=R(1), R(2), R(3) . . . R(N) are sequentially arranged from left to right; vertical coordinates y=L(1), L(2), L(3) . . . L(n) are sequentially arranged from the top down; a distance between adjacent horizontal coordinates is equal to a distance between adjacent vertical coordinates; and the horizontal coordinates of the real sub-pixels are as follows:
   as for an $L(1+5i_1)^{th}$ row, centers of the real sub-pixels are disposed at positions, the horizontal coordinates of which are $R(4+5k_1)$, $i_1$ being an integer not less than zero, and $k_1$ being an integer not less than zero;
   as for an $L(2+5i_2)^{th}$ row, centers of the real sub-pixels are disposed at positions, the horizontal coordinates of which are $R(2+5k_2)$, $i_2$ being an integer not less than zero, and $k_2$ being an integer not less than zero;
   as for an $L(3+5i_3)^{th}$ row, centers of the real sub-pixels are disposed at positions, the horizontal coordinates of which are $R(5+5k_3)$, $i_3$ being an integer not less than zero, and $k_3$ being an integer not less than zero;
   as for an $L(4+5i_4)^{th}$ row, centers of the real sub-pixels are disposed at positions, the horizontal coordinates of which are $R(3+5k_4)$, $i_4$ being an integer not less than zero, and $k_4$ being an integer not less than zero; and
   as for an $L(5+5i_5)^{th}$ row, centers of the real sub-pixels are disposed at positions, the horizontal coordinates of which are $R(1+5k_5)$, is being an integer not less than zero, and $k_5$ being an integer not less than zero.

11. The method for driving the pixel array according to claim 7, wherein a sub-pixel period is formed by three rows of real sub-pixels;
   a first row of real sub-pixels in the sub-pixel period are all real R sub-pixels;
   a second row of real sub-pixels in the sub-pixel period are all real B sub-pixels; and
   a third row of real sub-pixels in the sub-pixel period are all real G sub-pixels.

12. The method for driving the pixel array according to claim 11, wherein a mutual positional relationship between real sub-pixels is defined as follows:
   a horizontal axis and a vertical axis are provide on a plane; horizontal coordinates x=R(1), R(2), R(3) . . . R(N) are sequentially arranged from left to right; vertical coordinates y=L(1), L(2), L(3) . . . L(n) are sequentially arranged from the top down; a distance between adjacent horizontal coordinates is equal to a distance between adjacent vertical coordinates; and the horizontal coordinates of the real sub-pixels are as follows:
   as for an $L(1+5m_1)^{th}$ row, centers of the real sub-pixels are disposed at positions, the horizontal coordinates of which are $R(1+5n_1)$, $m_1$ being an integer not less than zero, $n_1$ being an integer not less than zero;
   as for an $L(2+5m_2)^{th}$ row, centers of the real sub-pixels are disposed at positions, the horizontal coordinates of which are $R(4+5n_2)$, $m_2$ being an integer not less than zero, $n_2$ being an integer not less than zero;
   as for an $L(3+5m_3)^{th}$ row, centers of the real sub-pixels are disposed at positions, the horizontal coordinates of which are $R(2+5n_3)$, $m_3$ being an integer not less than zero, $n_3$ being an integer not less than zero;
   as for an $L(4+5m_4)^{th}$ row, centers of the real sub-pixels are disposed at positions, the horizontal coordinates of which are $R(5+5n_4)$, $m_4$ being an integer not less than zero, $n_4$ being an integer not less than zero; and
   as for an $L(5+5m_5)^{th}$ row, centers of the real sub-pixels are disposed at positions, the horizontal coordinates of which are $R(3+5n_5)$, $m_5$ being an integer not less than zero, $n_5$ being an integer not less than zero.

13. A pixel array, comprising: a plurality of pixel units, wherein
   each pixel unit includes three sub-pixels of different colors; the three sub-pixels are respectively a red (R) sub-pixel, a green (G) sub-pixel and a blue (B) sub-pixel;
   in each pixel unit, a triangle is formed by connecting lines of center points of the three sub-pixels; each sub-pixel is in a shape of crisscross; the crisscross is formed by rectangles with a length-width ratio of 3:1 in a horizontal direction and a vertical direction respectively; and a length of the crisscross in the horizontal direction is equal to a length of the crisscross in the vertical direction; and wherein a sub-pixel period is formed by three rows of sub-pixels;
- a first row of sub-pixels in the sub-pixel period are all R sub-pixels;
- a second row of sub-pixels in the sub-pixel period are all B sub-pixels; and
- a third row of sub-pixels in the sub-pixel period are all G sub-pixels; and wherein a mutual positional relationship among sub-pixels is defined as follows:
- a horizontal axis and a vertical axis are provide on a plane; horizontal coordinates x=R(1), R(2), R(3) ... R(N) are sequentially arranged from left to right; vertical coordinates y=L(1), L(2), L(3) ... L(n) are sequentially arranged from the top down; a distance between adjacent horizontal coordinates is equal to a distance between adjacent vertical coordinates; and the horizontal coordinates of the sub-pixels are as follows:
    - as for an $L(1+5m_1)^{th}$ row, centers of the sub-pixels are disposed at positions, the horizontal coordinates of which are $R(1+5n_1)$, $m_1$ being an integer not less than zero, $n_1$ being an integer not less than zero;
    - as for an $L(2+5m_2)^{th}$ row, centers of the sub-pixels are disposed at positions, the horizontal coordinates of which are $R(4+5n_2)$, $m_2$ being an integer not less than zero, $n_2$ being an integer not less than zero;
    - as for an $L(3+5m_3)^{th}$ row, centers of the sub-pixels are disposed at positions, the horizontal coordinates of which are $R(2+5n_3)$, $m_3$ being an integer not less than zero, $n_3$ being an integer not less than zero;
    - as for an $L(4+5m_4)^{th}$ row, centers of the sub-pixels are disposed at positions, the horizontal coordinates of which are $R(5+5n_4)$, $m_4$ being an integer not less than zero, $n_4$ being an integer not less than zero; and
    - as for an $L(5+5m_5)^{th}$ row, centers of the sub-pixels are disposed at positions, the horizontal coordinates of which are $R(3+5\ n_5)$, $m_5$ being an integer not less than zero, $n_5$ being an integer not less than zero.

* * * * *